United States Patent [19]

Williams

[11] Patent Number: 5,039,188
[45] Date of Patent: Aug. 13, 1991

[54] APPARATUS AND METHOD FOR EXTRACTING OPTICAL ENERGY FROM OR COUPLING OPTICAL ENERGY INTO A FIBER

[75] Inventor: Gareth F. Williams, Jackson Heights, N.Y.

[73] Assignee: Nynex Corporation, New York, N.Y.

[21] Appl. No.: 458,843

[22] Filed: Dec. 29, 1989

[51] Int. Cl.⁵ .............................................. G02B 6/26
[52] U.S. Cl. ................. 385/32; 250/227.16; 385/48
[58] Field of Search ............... 350/96.10, 96.15, 96.16, 350/96.29; 250/227.11, 227.16

[56] References Cited

U.S. PATENT DOCUMENTS

| 4,270,839 | 6/1981 | Cross | 350/96.15 |
| 4,444,460 | 4/1984 | Stowe | 350/96.15 X |
| 4,474,431 | 10/1984 | Bricheno | 350/96.15 |
| 4,586,783 | 5/1986 | Campbell et al. | 350/96.15 |
| 4,747,652 | 5/1988 | Campbell et al. | 350/96.15 |
| 4,759,605 | 7/1988 | Shen et al. | 350/96.15 |
| 4,802,723 | 2/1989 | Miller | 350/96.15 |
| 4,824,199 | 4/1989 | Uken | 350/96.15 |
| 4,889,403 | 12/1989 | Zucker et al. | 350/96.15 |

FOREIGN PATENT DOCUMENTS 2409455 9/1975 Fed. Rep. of Germany ... 350/96.15

Primary Examiner—John D. Lee
Attorney, Agent, or Firm—Douglas Kirk; John J. Torrente

[57] ABSTRACT

An optical fiber tap or coupler in which optical energy is extracted from or coupled into an optical fiber via a bent section of the fiber and in which compression means is provided for applying a compression force along the fiber including along at least the radially outermost portion of the bent section to reduce the likelihood of fracture.

18 Claims, 2 Drawing Sheets

APPARATUS AND METHOD FOR EXTRACTING OPTICAL ENERGY FROM OR COUPLING OPTICAL ENERGY INTO A FIBER

BACKGROUND OF THE INVENTION

This invention relates to optical fibers and, in particular, to a method and apparatus for extracting optical energy or light from such fibers.

Optical fiber taps are known in the art in which optical energy or light is extracted from an optical fiber by bending the fiber. U.S. Pat. No. 4,802,723 discloses a fiber tap of this type in which the tap comprises a transparent tube which surrounds the fiber and has a detector at an end of the tube following the bent portion of the fiber. The detector receives light escaping from the fiber at the bent portion. The transparent tube is shown as either a straight tube which surrounds the fiber portion following the bent section or a bent tube which surrounds the bent section of the fiber and the fiber portions fore and aft of the bent section.

In fiber taps and couplers of the above type, the radius of curvature at the bend and the angle of the bent section determine the fraction of the optical energy extracted from the fiber. If it is desired that the extracted energy be relatively large (as might be required for taps and couplers situated further down a fiber optic transmission line), the radius of curvature at the bend must be relatively small.

As the radius of curvature at the bend of the fiber becomes smaller, however, the fiber becomes more susceptible to breaking, since the tension at the radially outer portion of the bent section of the fiber may exceed the fracture point of the fiber. For example, a bend of 0.5 cm radius causes a tensile strain of 1.25% at the outside of the bend for a typical optical fiber of 125 microns diameter. A strain of this amount can cause a bulk sample to fracture and, in addition, the stress is greater than the proof stress of usual optical fibers of this type.

It is therefore a primary object of the present invention to provide an apparatus and method for extracting optical energy from or coupling optical energy into a fiber which avoids the above disadvantages.

It is a further object of the present invention to provide an apparatus and method for extracting optical energy from or coupling optical energy into a fiber in which the likelihood of breaking of the fiber is reduced.

It is yet a further object of the present invention to provide an optical fiber tap or coupler for use in extracting optical energy from or coupling optical energy into the bent portion of an optical fiber in such a manner that the likelihood of fracture of the fiber at the bent portion is reduced.

SUMMARY OF THE INVENTION

In accordance with the principles of the present invention, the above and other objectives are realized in an apparatus which comprises a fiber having a bent section via which optical energy is to be extracted from or coupled into the fiber and which further comprises means for applying a compression force to at least the radially outermost portion of the bent section of the fiber. This compression force lessens or eliminates the tension in such radially outermost part of the bent section of the fiber, thereby enhancing the ability of the fiber to resist fracture.

In the embodiments of the invention to be disclosed hereinafter, a variety of fiber configurations and techniques are disclosed for creating and maintaining the aforementioned compression force in the fiber. Furthermore, in further aspects of the invention, the fiber can be annealed to reduce or eliminate stress or to reduce the optical guiding properties in the bent portion of the fiber.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
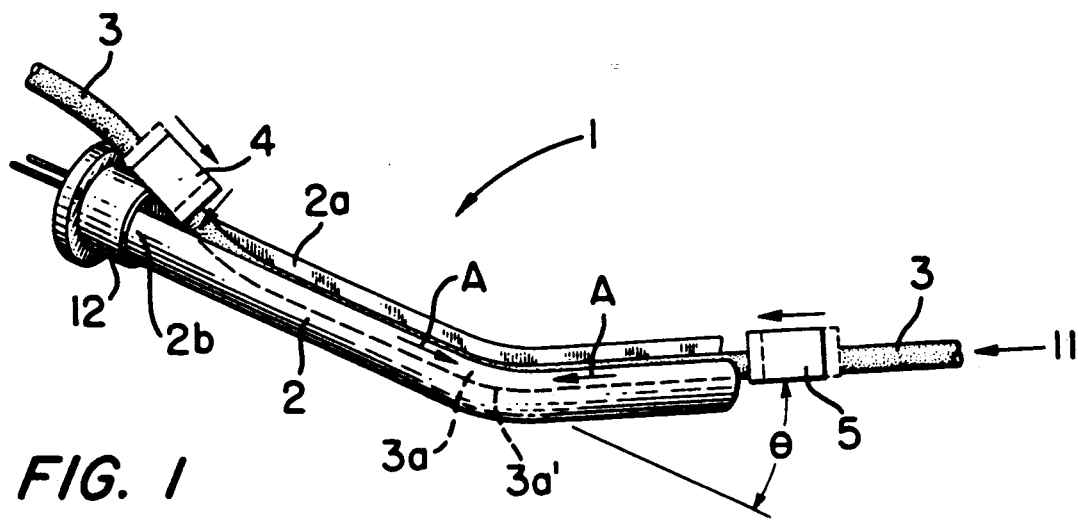
FIG. 1 shows a first embodiment of an apparatus in accordance with the principles of the present invention.

In FIG. 1, an apparatus in the form of a fiber tap 1 in accordance with the principles of the present invention is illustrated. The tap 1 comprises a curved, transparent capillary tube 2 having a slot 2a which receives the optical fiber 3. The curved tube creates a curved or bent section 3a of fiber 3 having a bend angle $\theta$. This bent section 3a allows optical energy 11 introduced into the fiber to escape therefrom and be collected by a detector 12 located at an end 2b of the tube 2.

In accordance with the principles of the present invention, the bent section 3a of the fiber 3 is subjected to a compression force F (depicted by arrows A) along the fiber. This force helps to at least partially counteract the tension in at least the radially outermost portion or part 3a' of the section 3a of the fiber. This tension resulted from bending the fiber and reducing the tension makes the fiber less prone to fracture.

In the FIG. 1 tap, the compression force has been established through the use of clamps 4 and 5 which have been shown pictorially for ease of illustration. These clamps, after attachment to the fiber 3, have been forced axially along the fiber from their original positions (shown in dotted lines) to their present positions and fixed in place. This movement forces the fiber into the tube, resulting in the compression force F, as above-indicated.

The clamps 4 and 5 may be a part of an overall jig (not shown) which holds the capillary tube 2 as well as the clamps. In order to maintain the compression force F, in the event the clamps 4, 5 are to be removed, a set/hardening glue (e.g., a UV curing cement or a thermally curing cement) can be applied to the slot 3a with the clamps in their present position and allowed to harden to hold the fiber under compression. Because, the jacket of the fiber 3 may be susceptible to creep, it may be desirable to remove the jacket prior to gluing in order to prevent creepage of the jacket from reducing the compression force. If so, the fiber entering and leaving the slot 2a preferably would remain jacketed; the jacket would preferably be removed at least in the bent region of the slot while leaving some jacketed fiber in each straight region of the slot. This reduces the chance of the fiber breaking.

As an alternative to gluing, the clamps 4, 5 may be retained in place with the support jig. In such case, the clamps and jig will form part of the tap 1.

Note that either clamp 4 or clamp 5 or both may be moved to create the compressive force. Note also that only a single clamp need be used to apply the compressive force if the fiber is glued into the slot on the other side of the bend. For example, if the fiber is glued into the slot 2a between the bent section 3a and the detector 12, the compression force can then be applied by clamp 5 and clamp 4 is not necessary.

Figure 2:
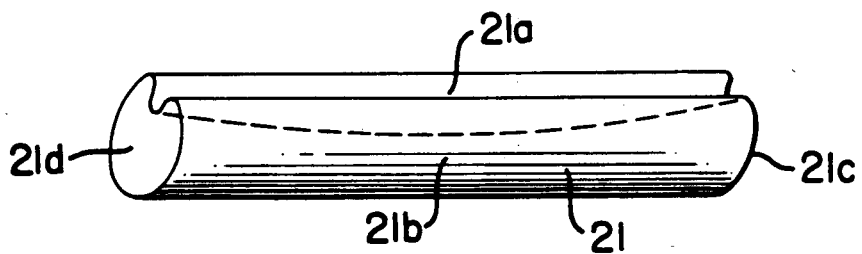
FIGS. 2 and 3 illustrate modifications of the apparatus of FIG. 1.
Figure 3:
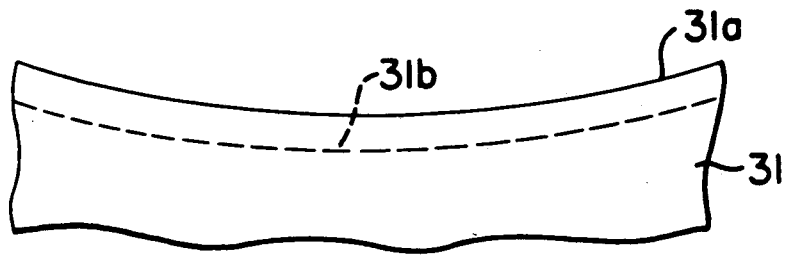

FIGS. 2 and 3 show alternate forms of support members which can be used instead of the curved capillary tube 2 to support the fiber 3. If these support members are used, the fiber 3 can be subjected to compression similarly as described above when using the capillary tube 2 as the support member. More particularly, the support member 21 in FIG. 2 has a groove 21a which decreases in depth in going from the center 21b of the member toward its opposite ends 21c and 21d. By placing the fiber 3 in the groove 21a, the fiber will follow the groove and thus be bent to create the bent section 3a as in the case of the capillary tube 2. In FIG. 3, the support member 31 has a concave surface 31a in which groove 31b, typically of uniform depth, has been provided. Here again, by placing the fiber 3 in the groove 31b, a bent section 3a will be created.

It should be noted that it is preferable to limit the overall length of the support members 2, 21 and 31. Preferably, their lengths should be sufficient to accommodate the bent section 3a with an additional length at each end sufficient to glue, clamp, or secure the jacketed fiber.

Figure 4:
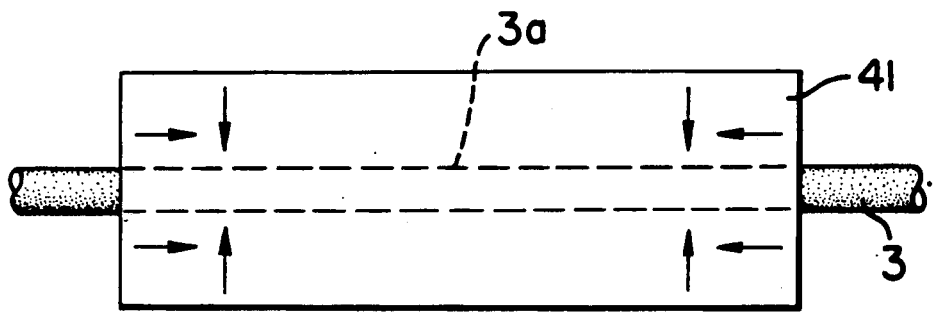
FIG. 4 shows a second embodiment of an apparatus in accordance with the principles of the present invention.

FIG. 4 illustrates a further embodiment of the invention in which the compression force along the fiber section 3a is achieved using a heat shrinkable member 41. In particular, the member 41 is placed so that it is in substantially surrounding relationship to the fiber 3. Heat is then applied to the member 41, causing it to shrink radially and longitudinally resulting in the compression force F along the radially outermost part of the section 3a.

The member 41 can be shrinkable tubing (teflon, vinyl, polyolefin and polyvinylidene fluoride being examples), a shrinkable wrap, or preferably a shrinkable coating. In the event the shrinkable tubing used only shrinks radially and not axially, the fiber 3 may be first placed in the larger bore of the tubing so that the fiber bends slightly. The ends of the fiber beyond the tubing can then be clamped and the tubing caused to shrink radially, thereby resulting in the desired compression force at the section 3a.

Alternatively, the member 41 may be made of a plastic material which shrinks upon cooling or curing and in which the fiber 3 is embedded or to which it is secured prior to such cooling or curing.

When using the shrinkable member 41, it may be necessary in some cases, particularly when a shrinkable tubing is employed, to employ a bonding agent on the surface of the member 41 contacting the fiber 3 to ensure long-term stability. Also when the member 41 is used, the bend section 3a in the fiber may be created before or after shrinking of the member 41 to create the compression force. If the member 41 is sufficiently thick and rigid at its ends, the member can itself support a detector for sensing the light escaping from the fiber bend section 3a. Otherwise, the composite unit of the fiber and member 41 can be placed in a support, such as the capillary tube in FIG. 1, which will serve to hold the detector as well.

Figure 5:
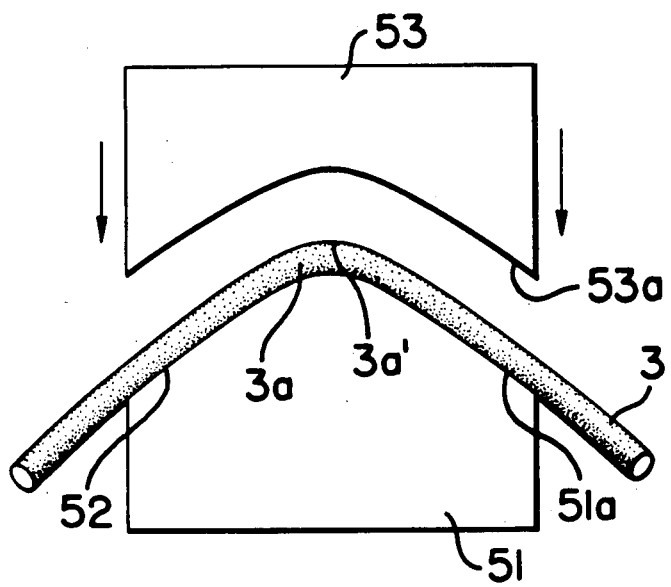
FIGS. 5 and 6 illustrate third and fourth embodiments of apparatus in accordance with the principles of the present invention.

FIG. 5 illustrates a further embodiment of the invention in which the fiber 3 is secured to a deformable convex surface 51a (e.g., a surface of soft plastic) of a member 51. The fiber 3 may be secured to the surface 51a along the entire length of the fiber as by glue 52 or only at it ends using mechanically stiff supports (not shown). By compressing the surface 51a, the fiber 3 and the radially outermost part 3a, of the fiber section 3a are subjected to the desired compression force F.

As shown in FIG. 5, the deformable surface 51a can be compressed by bringing a second surface 53a (shown as a concave surface of larger local radius than the surface 51a) of a second member 53 in contact with the deformable surface 51a along the length of fiber 3 or along the axis of the fiber.

Figure 6:
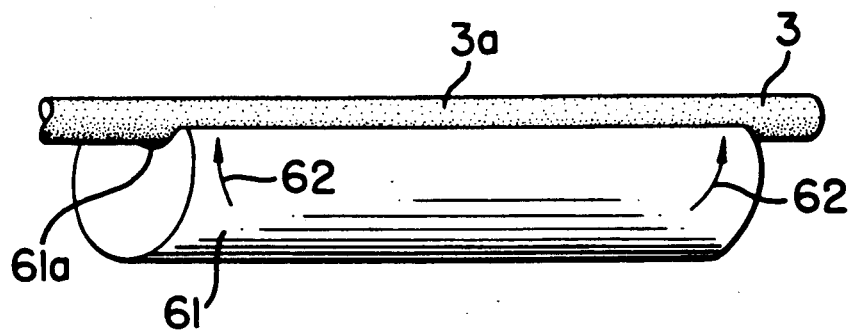

When using the deformable surface 51a for applying a compression force to the fiber section 3a, again, depending upon the characteristics of the member 51 and second member 53, a detector can be used directly with the member 51 or the second member 53 for detecting optical energy escaping from the bent fiber section 3a. Alternatively, the second member 53, can be a capillary tube with a detector at its end as in the FIG. 1 embodiment FIG. 6 illustrates a further embodiment of a configuration for establishing the desired compression force in the fiber 3. In this case, the fiber 3 is affixed (e.g., as by cementing) to a bendable member, shown as a rod 61 in FIG. 6, the member 61 having a slot 61a of depth short of the tube axis for receiving the fiber. By bending the member 61 towards the fiber as shown by the arrows 62, the radially outermost part of the fiber section 3a is placed in compression while being bent.

As an alternative to the use of slotted rod 61 for the deformable member, an unslotted rod, or strip or surface can also be used. Furthermore, if a rod is used, the fiber may be secured to the rod using a transparent shrinkable tubing, with or without a cement or bonding agent. As another alternative, the deformable member might be tubing which is both shrinkable and bendable and which has an asymmetric cross section, e.g., the bore of the tube is above the axis of the tube. In this case, the tubing would be shrunk to secure the fiber and then bent away from the thick-walled side to obtain the compression.

Bending of the member 61 with secured fiber 3 can be accomplished using a curved mandrel. If the member 61 is a transparent rod, and the slot made deep enough to collect the light, the detector may be placed at one end, in a manner directly analogous to FIG. 1. The optics are then also directly analogous to that of FIG. 1. If the member 61 is a transparent rod of small diameter and the slot 2a in tube 2 of FIG. 1 is made large enough to accommodate member 61, tube 2 of FIG. 1 can serve as the mandrel. Here again, the member 61 must be bent towards the fiber. In this way, the resultant composite of transparent capillary tube 2 with detector and bent tube 61 (which would also be made transparent) with fiber 3 can form the completed fiber tap.

The member 61 might also be made reflective. In such case, the optical energy escaping from the fiber 3 would be reflected toward the inside of the bend. As a result, the detector of the tap would be situated at such inside position to collect the reflected light.

If a strip of material is used as the deformable member and the strip and fiber together act as half of a bend-enhanced evanescent coupler, the strip would typically be relieved in the immediate coupling region to allow close contact of the other half-coupler with the fiber. In the limiting case, the strip might have a U-shaped cross-section. The fiber would then be cemented to the bottom of the U, and the strip would be bent so the top of the U was in tension and the bottom supporting the fiber in compression. This would place the radially outer part 3a' of the bent section 3a in compression as required. The second half-coupler could then be placed inside the U, in contact with the fiber.

In a further aspect of the present invention, in order to relieve stress on the bent fiber section 3a in the fiber taps and couplers described above, the fiber 3, after being bent, can be annealed. This can be accomplished by using conventional annealing techniques. Thus, for example, annealing might be applied by a small oven, by an electric discharge, by a flame or by a heated surface or mandrel. The latter three techniques allow rapid heating of the fiber exterior without causing inter-diffusion of the glass inside the fiber, which would typically impair the guiding properties of the fiber. To ensure no impairment, conventional optical feedback control may be used to monitor the annealing and terminate it if or when it begins to weaken the guiding properties of the fiber.

Alternatively, if it is desired to locally weaken the guiding properties of the fiber to facilitate extraction of the optical energy, the annealing treatment (under optical feedback control) can be continued until the desired degree of weakening is realized. This could also be carried out with the fiber yet unbent. When the fiber is then bent, the degree of bending can now be less while still realizing the same level of extracted light. Also, the annealing could be graded to provide a gradual transition from the region of the fiber with weakened transmission capabilities to the bordering regions having normal transmission capabilities.

In carrying out the annealing procedure, it may be desirable to repeat cycles of annealing followed by bending (or vice-versa), until the desired characteristics are achieved. This procedure would make it possible to realize extremely tight bends of the fiber in forming the fiber tap.

As can be appreciated from the above, the invention has application to both simple fiber bend taps as well as bend-enhanced evanescent fiber couplers. Also, the invention has application to other couplers utilizing fiber bends, such as, for example microbend couplers in which light is coupled out of a fiber by repeated cyclic microbends of the fiber.

It will also readily be appreciated that the taps and couplers described herein can be used to couple light into a fiber as well as extract light from a fiber. For example, in FIG. 1, if the detector 12 were replaced by a light source with lensing to direct the light back into the fiber in the same cone as the light in the fiber is emitted, then light will be coupled back into the fiber at the bend. Similarly, the evanescent couplers work both ways.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. Apparatus comprising:
    an optical fiber having a bent section via which optical energy is to be extracted from or coupled into said fiber;
    a transparent capillary tube surrounding said fiber;
    means for applying a compression force along the fiber and in the direction of the length of the fiber;
    and means for detecting the optical energy extracted from said fiber and for applying optical energy to the fiber.

2. Apparatus in accordance with claim 1 wherein:
    said capillary tube has a bent region which accommodates said bent section of said fiber.

3. Apparatus in accordance with claim 2 wherein:
    said capillary tube has a slot into which said fiber is placed.

4. Apparatus in accordance with claim 1 wherein:
    said detecting means is situated at one end of said tube.

5. Apparatus in accordance with claim 1 wherein:
    said compression means includes means holding said fiber in a compressed state when supported in said capillary tube.

6. Apparatus in accordance with claim 5 wherein:
    said holding means includes one of cement or clamps.

7. Apparatus in accordance with claim 1 wherein:
    said compression force is applied to at least the radially outermost portion of the bent section of the fiber.

8. Apparatus comprising:
    an optical fiber having a bent section via which optical energy is to be extracted from or coupled into said fiber;
    and means for applying a compression force along the fiber and in the direction of the length of the fiber, said compression means comprising heat shrinkable means which has been heat shrunk around said fiber.

9. Apparatus in accordance with claim 8 wherein:
    said heat shrinkable means is one of a tubular member or a coating.

10. Apparatus in accordance with claim 8 wherein:
    said heat shrinkable means is a plastic.

11. Apparatus comprising:
    an optical fiber having a bent section via which optical energy is to be extracted from or coupled into said fiber;
    and means for applying a compression force along the fiber and in the direction of the length of the fiber, said compression means comprising a bendable means to which said fiber is affixed and which has been subjected to a force to bend said bendable means toward said fiber and create the compression of said bent section, said bendable means comprising a heat shrinkable rod having a slot which extends to a depth above the central axis of said rod and said fiber is disposed in said slot.

12. Apparatus comprising:
    an optical fiber having a bent section via which optical energy is to be extracted from or coupled into said fiber, said fiber being annealed to relieve stress at said bent section;
    and means for applying a compression force along the fiber and in the direction of the length of the fiber.

13. Apparatus in accordance with claim 12 wherein:

said annealing is such as to reduce the optical guiding properties of said fiber at said bent section.

14. Apparatus comprising:

an optical fiber having a bent section via which optical energy is to be extracted from or coupled into said fiber, the fiber being annealed to relieve stress at said bent section.

15. Apparatus comprising:

an optical fiber having a bent section via which optical energy is to be extracted from or coupled into said fiber, the fiber being annealed to reduce the optical guiding properties of said fiber at said bent section.

16. A method for use in extracting optical energy from or coupling optical energy into a fiber comprising:

bending the fiber to create a bent section of the fiber via which optical energy can escape from or be coupled into the fiber;

and annealing the fiber to relieve the stress at the bent section of the fiber.

17. A method of extracting optical energy from or coupling optical energy into a fiber comprising:

bending the fiber to create a bent section of the fiber via which optical energy escapes from or is coupled into the fiber;

and annealing the fiber to reduce the optical guiding properties at the bent section of the fiber.

18. Apparatus comprising:

an optical fiber having a bent section via which optical energy is to be extracted from or coupled into said fiber;

and means for applying a compression force along the fiber and in the direction of the length of the fiber, said compression means comprising a plastic which shrinks upon cooling or curing.

* * * * *

UNITED STATES PATENT AND TRADEMARK OFFICE
CERTIFICATE OF CORRECTION

PATENT NO. : 5,039,188

DATED : August 13, 1991

INVENTOR(S) : Gareth F. Williams

It is certified that error appears in the above-identified patent and that said Letters Patent is hereby corrected as shown below:

Col. 2, line 33.   After "of" insert -- the --
Col. 4, line 3.    After "tube" insert -- 2 --
Col. 4, line 12.   Change "3a" to -- 3a' --
Col. 4, line 14.   Change "5!a" to -- 51a --

Signed and Sealed this

Fifteenth Day of December, 1992

Attest:

DOUGLAS B. COMER

Attesting Officer

Acting Commissioner of Patents and Trademarks